Oct. 16, 1951     B. F. LAWRENCE ET AL     2,571,729
ICE-CREAM DISHER
Filed July 15, 1949
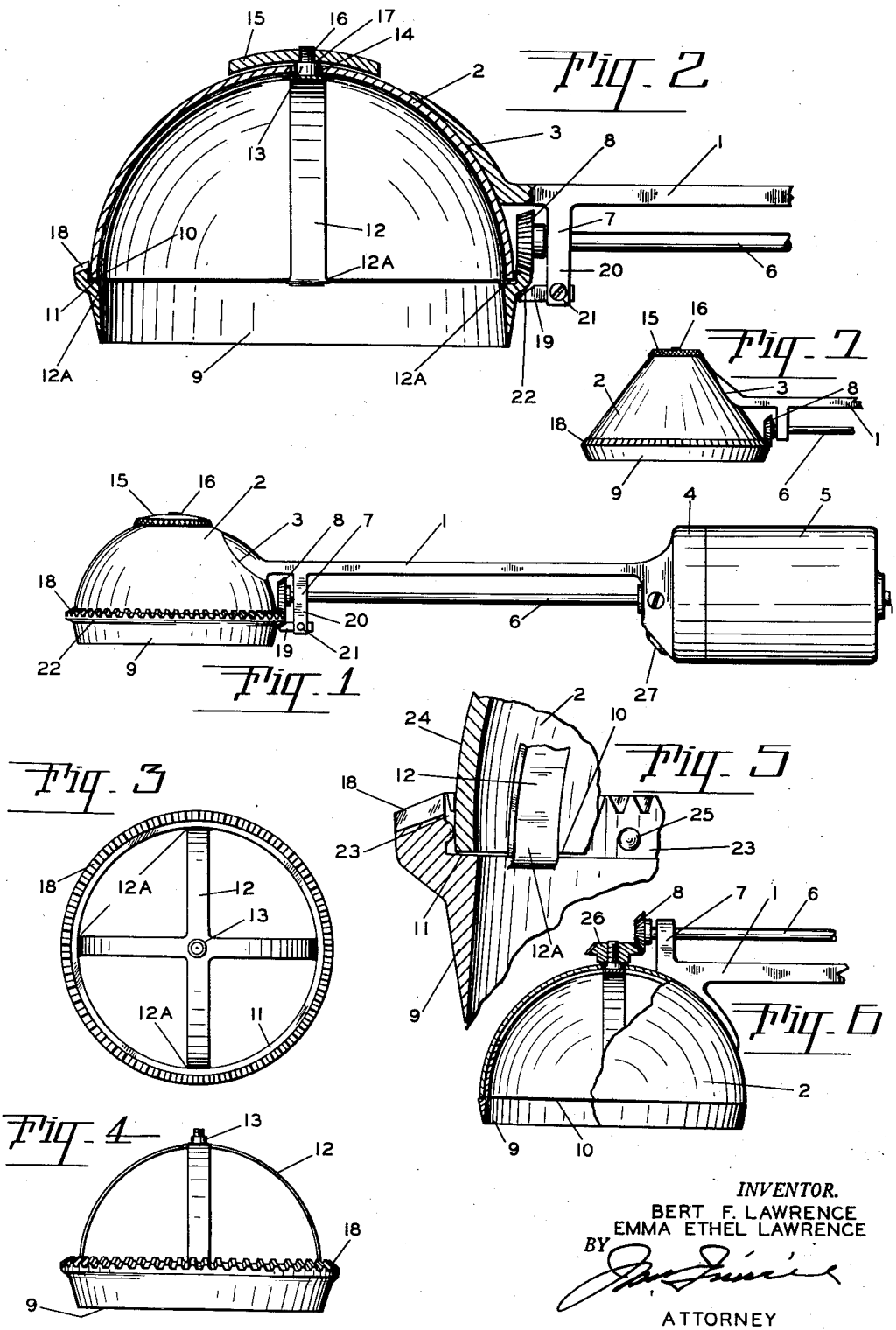
INVENTOR.
BERT F. LAWRENCE
EMMA ETHEL LAWRENCE
BY
ATTORNEY Patented Oct. 16, 1951

2,571,729

UNITED STATES PATENT OFFICE 2,571,729

ICE-CREAM DISHER

Bert F. Lawrence and Emma Ethel Lawrence,
Portland, Oreg.

Application July 15, 1949, Serial No. 104,948

3 Claims. (Cl. 107—48)

This invention relates to ice cream dishers and is particularly adapted for the dishing out of hard ice cream.

The primary object of this invention is the provision of a rotatable cutting lip applied to the bowl of the disher that is rotated by an electric motor or other driving means, by way of a drive shaft and pinion applied to a ring gear forming part of the lip, said gears being exposed to conform to sanitation laws.

This application is an improvement over our now issued United States Patent Number 2,412,050, and our pending application Serial Number 650,554, now Patent No. 2,540,397, dated February 6, 1951, and as stated above the primary object is to rotate the cutting edge of the disher by a set of gears exposed and accessible for cleansing.

These and other incidental objects will be apparent in the drawings, specification and claims.

Referring to the drawings:

Figure 1 is a side view of our new and improved disher.

Figure 2 is an enlarged detail sectional view of the disher, including the bowl, cutting lip and driving gears.

Figure 3 is a plan view of the cutting lip removed from the disher bowl.

Figure 4 is a side view of Figure 3.

Figure 5 is an enlarged detail sectional view, taken of part of the disher bowl and the cutting lip. This is a slightly modified form of assembly from that shown in the above referred to figures.

Figure 6 is another preferred method of driving the cutting lip.

Figure 7 is still another preferred shape of bowl construction of disher.

Referring more specifically to the drawings:

Our new and improved ice cream disher consists of an elongated frame 1, having a disher bowl 2 fixedly secured to one of its ends, as at 3. Its opposite end terminating in a special housing 4, which in turn is mounted to the electric motor 5. The housing 4 encases a chain of gears of any conventional type for reducing the speed of the driven shaft 6 to the desired speed for operating the disher.

The shaft 6 is journalled within a bearing 7, forming part of the frame 1, and has a pinion gear 8 fixedly secured thereto. A cutting lip 9 in the form of a ring, is adapted to be mounted to the edge 10 of the bowl 2 by way of the shoulder 11, best illustrated in Figure 2. The lip is held against the edge 10 of the disher bowl 2 by the semi-circular bands 12, terminating in the stub shaft 13 at their intersection and fixedly secured to the cutting lip 9 at 12A.

The stub shaft 13 is adapted to pass through the opening 14 of the bowl 2 and has a locking nut 15 threaded thereon at 16 and against the shoulder 17. This holds the shoulder 11 of the lip 9 against the edge of the bowl while the lip is being revolved by the following method.

The ring gear 18 is formed on the outer edge or rim of the cutting lip 9 and is adapted to receive the pinion 8 of the drive shaft 6 and be revolved thereby by the electric motor 5. Ordinarily the semi-circular bands 12 will maintain the lip in contact with the bowl 2, but we have provided a retaining bar 19 fixed within the bracket 20 of the frame 1 by way of the locking screw 21. This bar engages the lower edge 22 of the ring gear 18 and absorbs the thrust between the said ring gear and the pinion 8. We do not wish to be limited to using this locking bar, as it may not be necessary.

In Figure 5 we illustrate a method of preventing the inner edge 23 of the lip 9 from engaging the outer surface 24 of the bowl 2, which may tend to reduce friction in the operation of the lip. Contact is made between the inner edge 23 of the lip and the outside of the bowl by the raised portions 25 engaging the outer portion of the bowl 2, but in a few locations around the periphery of the same.

In Figure 6 we illustrate another preferred form of driving the lip 2 by substituting the pinion 26 for the locking nut 15 and mounting the drive pinion 8 above the bottom of the bowl as indicated. This construction still comes within the object of our invention, and that is to rotate the bowl 2 by a set of gears that are not encased in grease or oil, but are in the open allowing the operator to maintain the same in a sanitary condition.

We will now describe the operation of our new and improved ice cream disher. Any suitable electric control button, as indicated at 27, is operated by the operator. This starts the electric motor 5 which rotates the cutting lip 9 by way of the drive shaft 6 running at a relatively slow speed, the pinion 8 engaging the ring gear 18 and rotating the lip within the bowl cutting into the ice cream. The rotating of the lip 9 and the semi-circular band 12 also assists in the dispensing of the ice cream from within the bowl 2 after the same has been removed from the ice cream container and about to be discharged into the receiving receptacle.

Although certain specific embodiments of the invention have been shown and described, it is obvious that many modifications thereof are possible. The invention, therefore, is not to be restricted except in so far as is necessitated by the prior art and by the spirit of the appended claims.

What we claim is:

1. An ice cream spoon comprising a handle and a bowl, a rotative knife at the edge of the bowl, the knife having a flat surface to engage the edge of the bowl, a flange extending from the flat surface and surrounding the outer free end of the bowl, the flange having gear teeth on its edge, scrapers extending from the knife into the bowl and engaging the surface of the latter, means for pivotally mounting the scrapers at the center of the bowl, a gear wheel engaging the gear teeth on the flange, means supported by the handle and in engagement with the flange directly opposite the gear wheel to retain the gear teeth on the flange in mesh with the gear wheel, and means for rotating the gear wheel.

2. An ice cream spoon as defined in claim 1, wherein the flange is spaced from the outer surface of the bowl, and lugs on the inner face of the flange extend into the space formed between the flange and the bowl and bear on the outer surface of the bowl.

3. An ice cream spoon as defined in claim 1, wherein the means supported by the handle and in engagement with the flange directly opposite the gear wheel to retain the gear teeth on the flange in mesh, includes an arm extending from the handle, and a removable element mounted on the arm and projecting toward the flange and in engagement therewith.

BERT F. LAWRENCE.
EMMA ETHEL LAWRENCE.

REFERENCES CITED

The following references are of record in the file of this patent:

UNITED STATES PATENTS

| Number | Name | Date |
|---|---|---|
| 1,296,745 | Bluhm | Mar. 11, 1919 |
| 1,392,490 | Genth et al. | Oct. 4, 1921 |
| 1,574,788 | Brueseke | Mar. 2, 1926 |
| 1,763,389 | Chapman | June 10, 1930 |
| 1,773,013 | Schupfer et al. | Aug. 12, 1930 |
| 2,412,050 | Lawrence et al. | Dec. 3, 1946 |
| 2,439,125 | Bolinger | Apr. 6, 1948 |